United States Patent [19]
Lee et al.

[11] Patent Number: 5,062,164
[45] Date of Patent: Nov. 5, 1991

[54] AUTOMATIC MIXING FAUCET

[76] Inventors: Chang H. Lee, 300 Winston Dr., Apt. 810, cliffside Park, N.J. 07010; Young J. Kim, Seoul, Rep. of Korea

[21] Appl. No.: 374,666

[22] Filed: Jun. 30, 1989

Related U.S. Application Data

[63] Continuation-in-part of Ser. No. 359,994, Jun. 1, 1989, Pat. No. 4,953,236, which is a continuation of Ser. No. 244,135, Sep. 14, 1988, Pat. No. 4,886,207.

[51] Int. Cl.$^5$ .......................... E03C 1/04; C11D 9/18
[52] U.S. Cl. ....................................... 4/194; 137/613; 251/129.04
[58] Field of Search .................. 236/12.12, 12.11; 4/623, 194; 251/129.04, 129.11; 137/613

[56] References Cited

U.S. PATENT DOCUMENTS

| | | | |
|---|---|---|---|
| 2,798,689 | 7/1957 | Houghton | 236/80 G |
| 3,372,708 | 3/1968 | Hotchkin | 137/624.2 |
| 4,762,273 | 8/1988 | Gregory et al. | 236/93 R |

*Primary Examiner*—William E. Wayner
*Attorney, Agent, or Firm*—Pasquale A. Razzano

[57] ABSTRACT

An electronic water faucet including an infra-red sensor to detect the presence of an object near the faucet outlet. When an object is sensed an electric motor via a transmission operates a pilot valve to control a main water faucet valve of the piston type to allow water delivery.

8 Claims, 17 Drawing Sheets

FIG. 8a
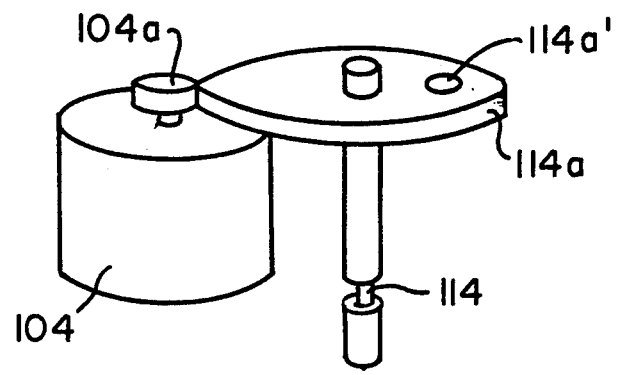
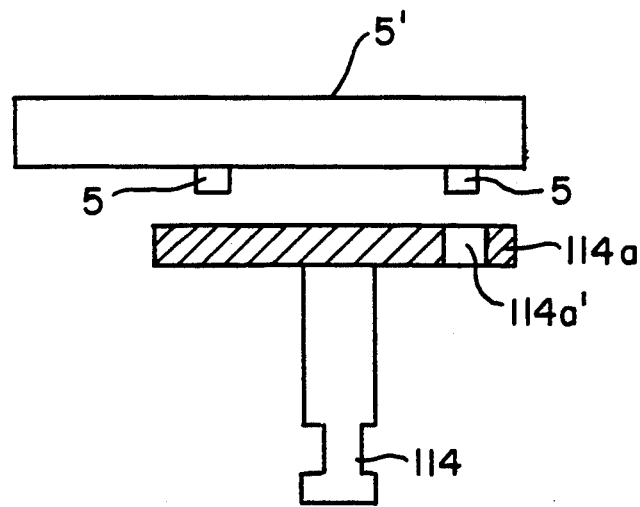
FIG. 8b

BLOCK DIAGRAM

TIME CHART

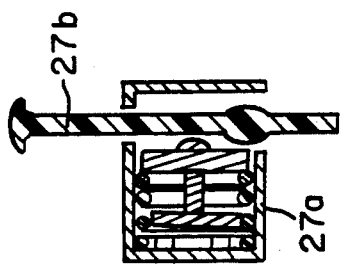
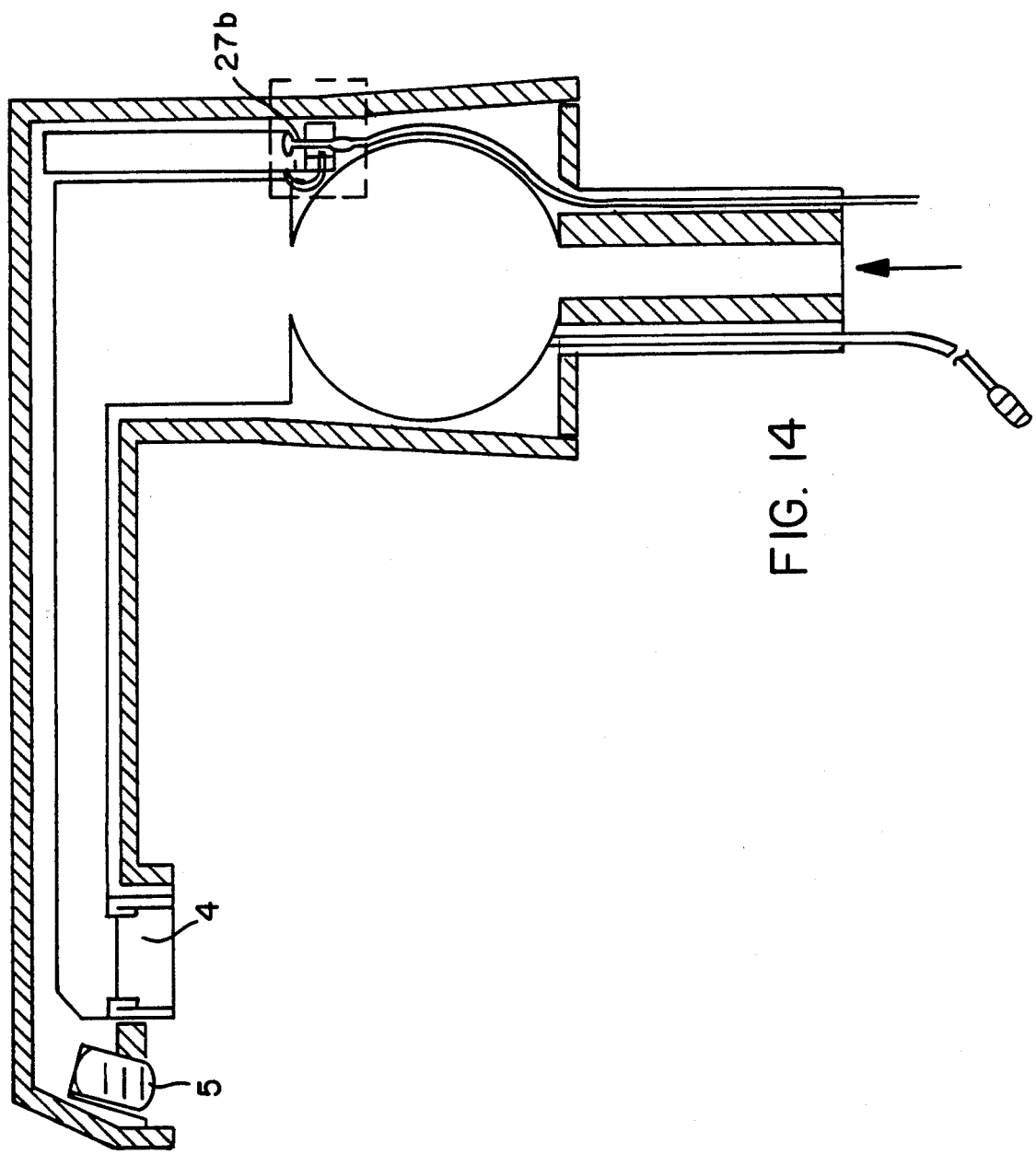

AUTOMATIC MIXING FAUCET

This application is a continuation-in-part of U.S. Pat. Application Ser. No. 359,994, filed June 1, 1989, now U.S. Pat. No. 4,953,236 which is a continuation of U.S. Pat. Application Ser. No. 244,135, filed Sep. 14, 1988, now U.S. Pat. No. 4,886,207.

BACKGROUND OF THE INVENTION

The present invention relates to a service water tap or faucet which automatically controls operation and discharge of a water supply.

More specifically, the invention relates to an automatic service water tap or faucet which comprises a detecting sensor, compact faucet body or spout. The sensor and an aerator are installed in a nozzle cover mounted on the outlet end of the faucet body. To prevent inadvertent operation of the faucet by reflected light, the sensor is mounted at an angular position of from 0° to 20° from the vertical, with the optimum position being 10°.

The water controller, an electronic circuit (hybrid IC), and a hot and cold mixing valve are installed compactly inside the faucet body, while the check valve assembly, the battery case and the filter assemblies are mounted separately on a lower part of the faucet body. The filter assemblies are connected between the water supply pipe and the flexible connector (or tube); the check-valve assembly is connected to the base of the lower part of the faucet body by a coupling; and the battery case is coupled with the check valve assembly.

PRIOR ART

Heretofore, there have been service water taps intended to be controlled automatically with an ON/OFF operation of a water supply valve by utilizing a detecting sensor. One such system is disclosed in U.S. Pat. No. 4,741,363. However, in such previously proposed devices the components are arranged independently and then connected to each other so that they could not be made small-sized and lightweight by integrating every component as an article. Therefore, the desired effects were not obtained because establishing operation of the device was not easy and the external appearance was unsatisfactory.

Moreover, in certain conventional automatic faucets, as shown for example in FIG. 7, a solenoid coil 10 is magnetized as soon as a sensor perceives the presence of a physical object; at the same time a diaphragm 12 is opened to pass water rapidly. If the object is removed from the detecting range of the sensor, electric power supplied to the solenoid coil will be cut off. As a result, the diaphragm is suddenly closed, stopping water flow. Because of the resulting high water pressure difference a water hammer shock occurs. Whenever the valve opens and closes, this water hammer shock rattles the water supply pipes. If such shocks last long enough they can loosen or rupture the coupling parts of the pipe making a water leak.

By the present invention water hammer shock in automatic faucets is minimized. The invention lengthens the operating time for the opening and closing action of the valve as compared to a conventional water supply valve, and prevents sudden opening and closing of the valve. Instead of a diaphragm which performs the opening and closing action in a conventional valve, a valve piston of special structure is used. A pilot valve in the valve controller which controls opening and closing of the valve piston discharges water to reduce water pressure in a second chamber, with the valve piston being designed to open the water passageway in response to water pressure in a first chamber. Water hammer shock is minimized by lengthening the water discharging time in the second chamber and the operating time of the piston.

OBJECTS OF THE INVENTION

It is an object of the present invention to provide an automatic faucet whose operation is completely automized.

It is another object of the invention to provide an automatic faucet in which all of the operative components are located within the body of the faucet, so that it can be of compact, small-size and of good appearance.

Another object of the invention is to provide an automatic faucet which can be easily installed in place of an existing faucet.

Yet another object is to minimize water hammer shock and damage to water supply pipes in an automatic faucet.

A further object of the invention is to avoid malfunctions and inadvertent operation of the automatic faucet caused by reflected light.

A still further object of the invention is to reduce operating costs by reducing breakdowns or leaking caused by heavy use of the faucet.

Yet another object of the present invention is to provide an automatic service water tap which can be substituted for an existing conventional service water tap while keeping all of the other remaining facilities (i.e., plumbing lines) as they were without any damage.

A further object of the invention is to provide an automatic service water tap which can be easily installed without providing new electric power lines so that the construction cost will be greatly decreased and so that the device can be utilized semi-permanently.

A still further object of the present invention is to provide an automatic service water tap which has an energy saving and economical effect, by allowing the automatic service water tap to be changed easily without any difficulties in existing buildings.

It is another object of the present invention to provide an automatic water supply valve which has a unique shape designed to minimize water hammer shock.

Another object of the invention is to provide an automatic water supply valve which has an automatic cutoff function.

Yet another object of the present invention is to provide an automatic water supply valve which has a semi-automatic function.

SUMMARY OF THE INVENTION

In accordance with an aspect of the present invention, an automatic faucet is provided in which the opening and closing operation of a water supply valve is controlled automatically by a signal received at the sensor. When a signal emitted from the emitting element of the sensor reflects from a physical object, it will be received by the photo detector of the sensor. This detecting signal inputs to the electronic control circuits of the device through an amplifier. The processed signal from the amplifier controls the water supply valve through a valve controller so that water flows out of, or stops flowing through, the automatic faucet.

Opening and closing of the water supply valve is performed by a valve piston. To minimize water hammer shock, the valve piston is driven by a valve driving motor and a pilot valve in a valve controller to prevent sudden opening and closing of the valve, and to make the operation of the valve more smooth.

A hot and cold water mixing valve may be provided which comprises a control screw and knob to set the desired water temperature. A temperature sensor maintains the set water temperature by sensing temperature change in the water. That sensor is installed to maintain the temperature of the water which flows out of the automatic faucet. The amount of water which flows out from the faucet may also be controlled.

When hands or physical objects are placed in the detecting range of the sensor after the temperature control knob to set the desired temperature and the water flow control knob adjusted to set the amount of water appropriately, water of desired temperature and amount will flow out automatically. Additionally, according to another feature of the invention, water flow will stop automatically after a preset time (30-60 seconds), in case gum or paper is attached on the surface of the sensor or if an object is placed within the detecting range of the sensor.

The automatic faucet of the present invention can be used for more than three years with a small battery, because the power consumption of the water supply valve and the sensor is minimized.

BRIEF DESCRIPTION OF THE DRAWINGS

FIGS. 8a and 8b are schematic diagrams illustrating the operating condition of the motor and the cam which control the pilot valve;

FIG. 14 is a side sectional view of a faucet constructed according to the invention illustrating operating of the drainage control.

FIG. 14a is an enlarged sectional view of the portion of FIG. 14 boxed in dotted lines.

DETAILED DESCRIPTION OF THE INVENTION

Figures 1, 1A:
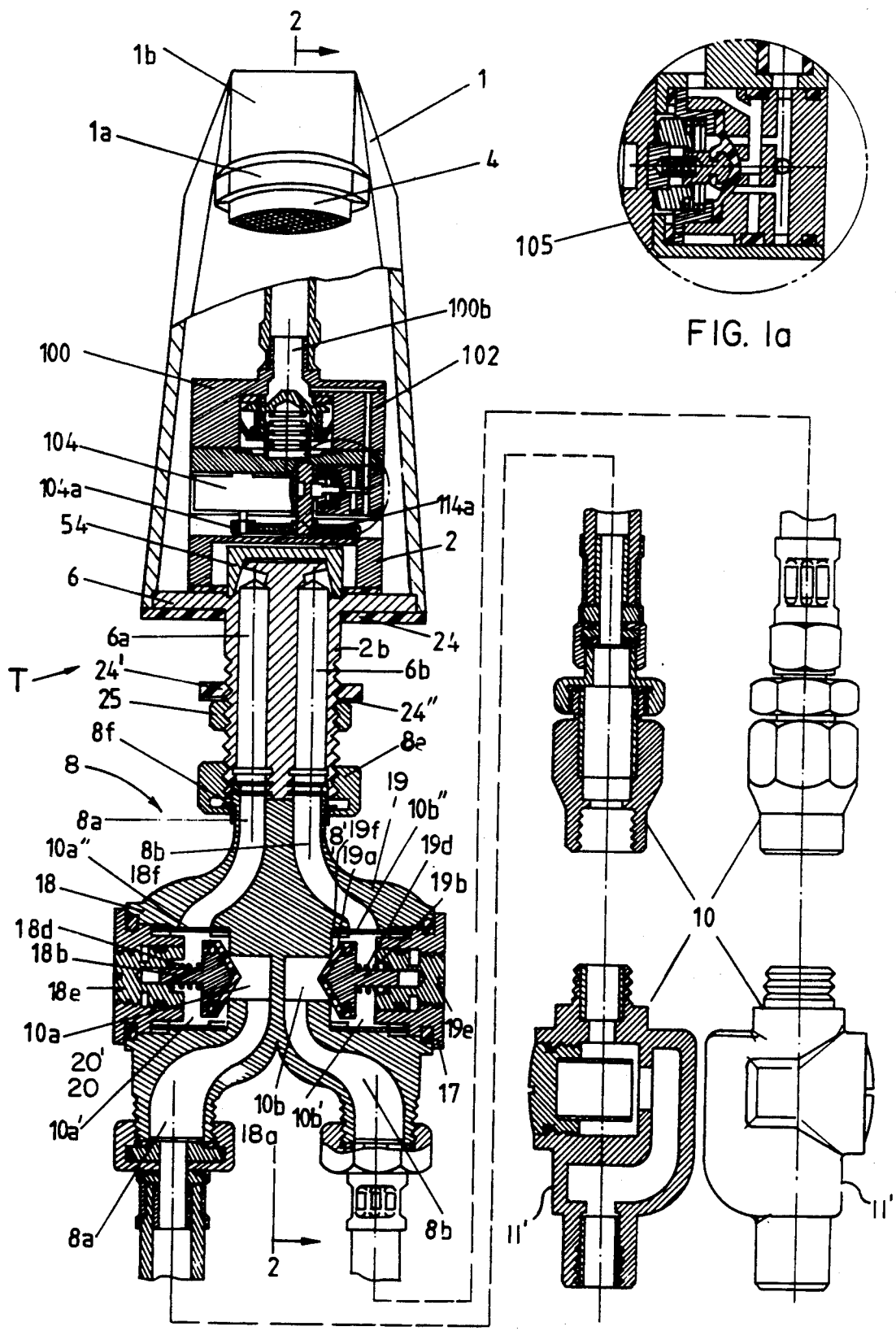
FIG. 1 is a front view, partially in section of an automatic faucet according to the present invention.
FIG. 1a is an enlarged sectional view of the phantom circled portion of FIG. 1.
Figure 2:
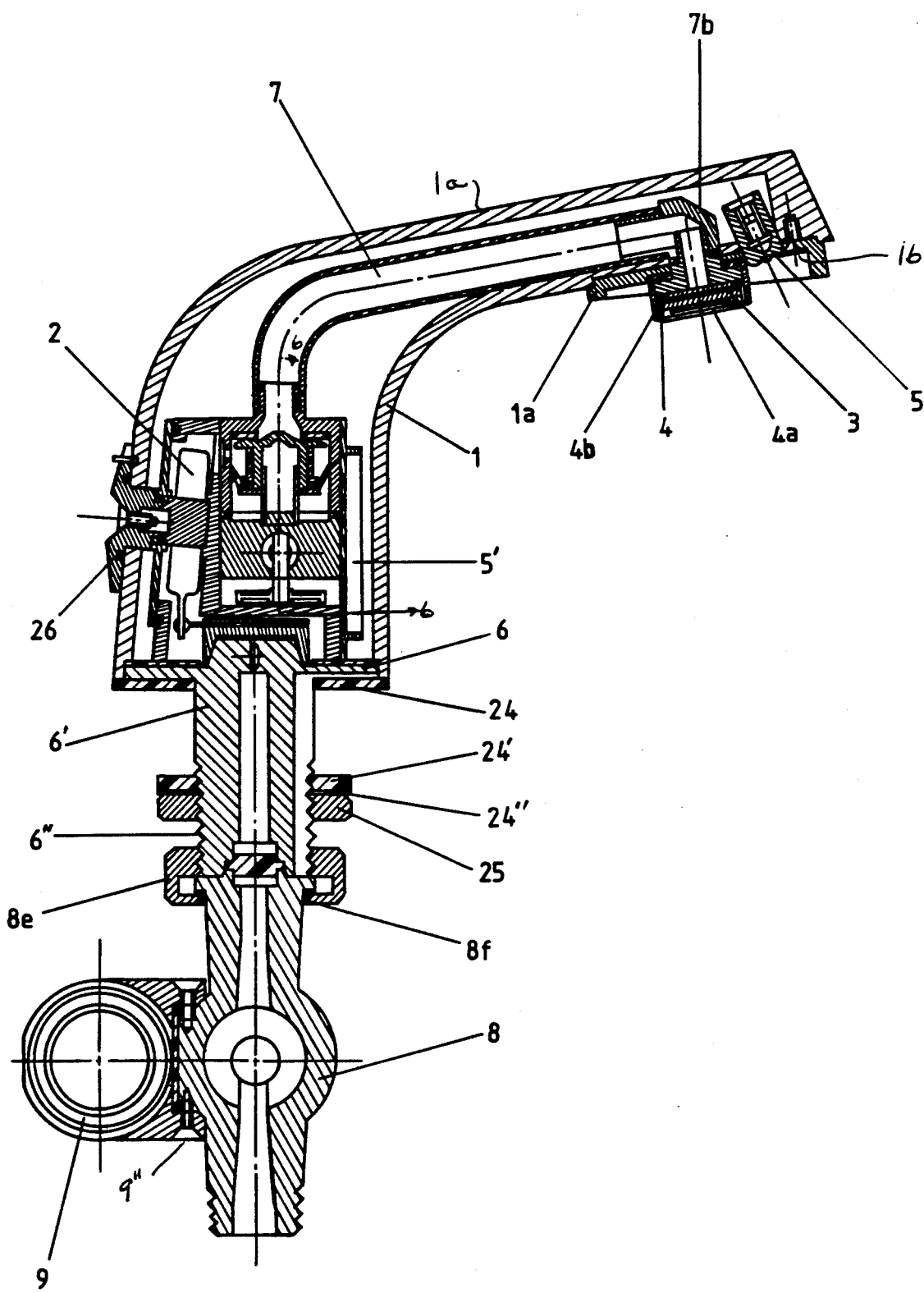
FIG. 2 is a partial cross-sectional view from the left side, taken along line 2—2 of FIG. 1.
Figure 3:
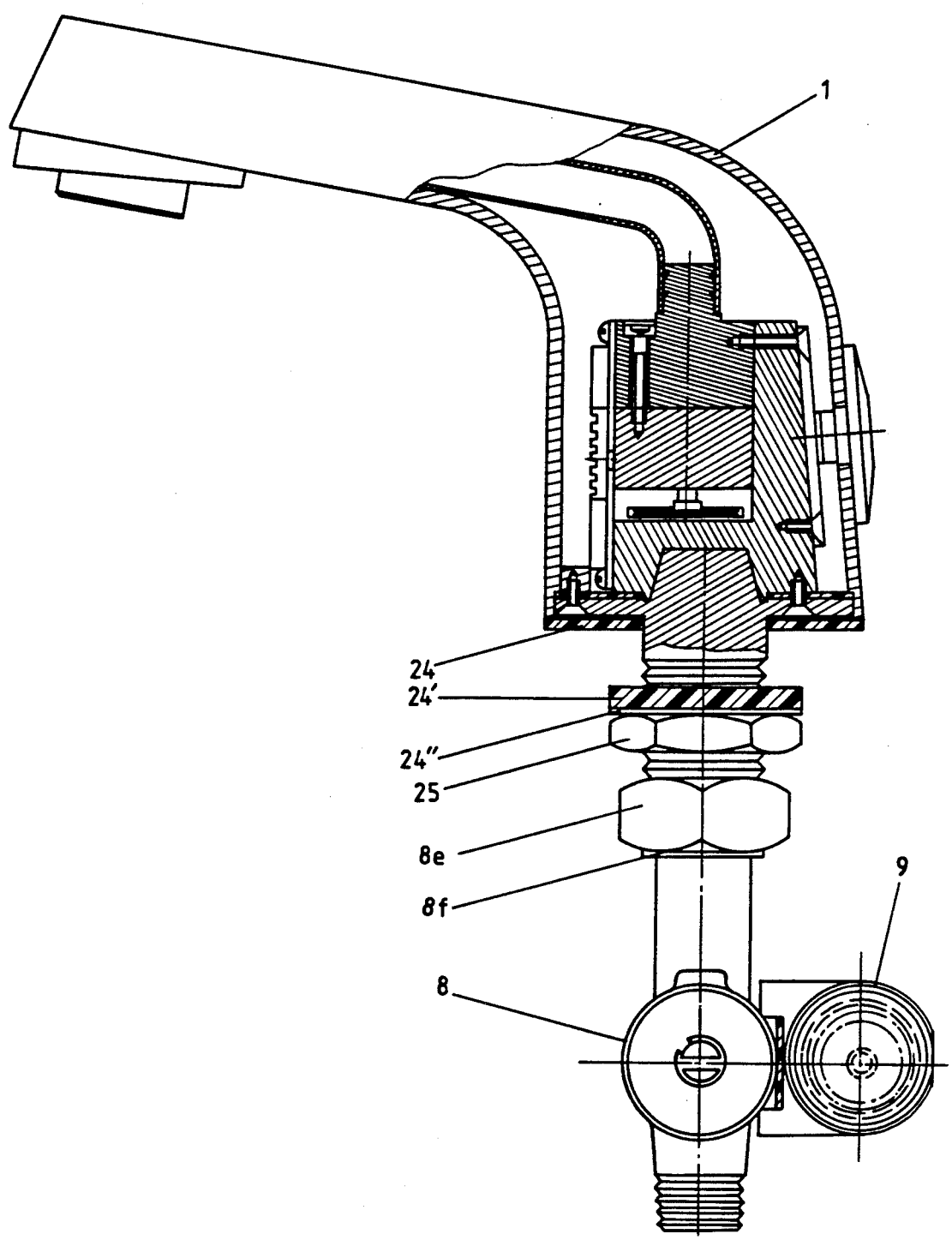
FIG. 3 is a side view from the right side, with parts broken away, of the automatic faucet of FIG. 1.
Figure 4:
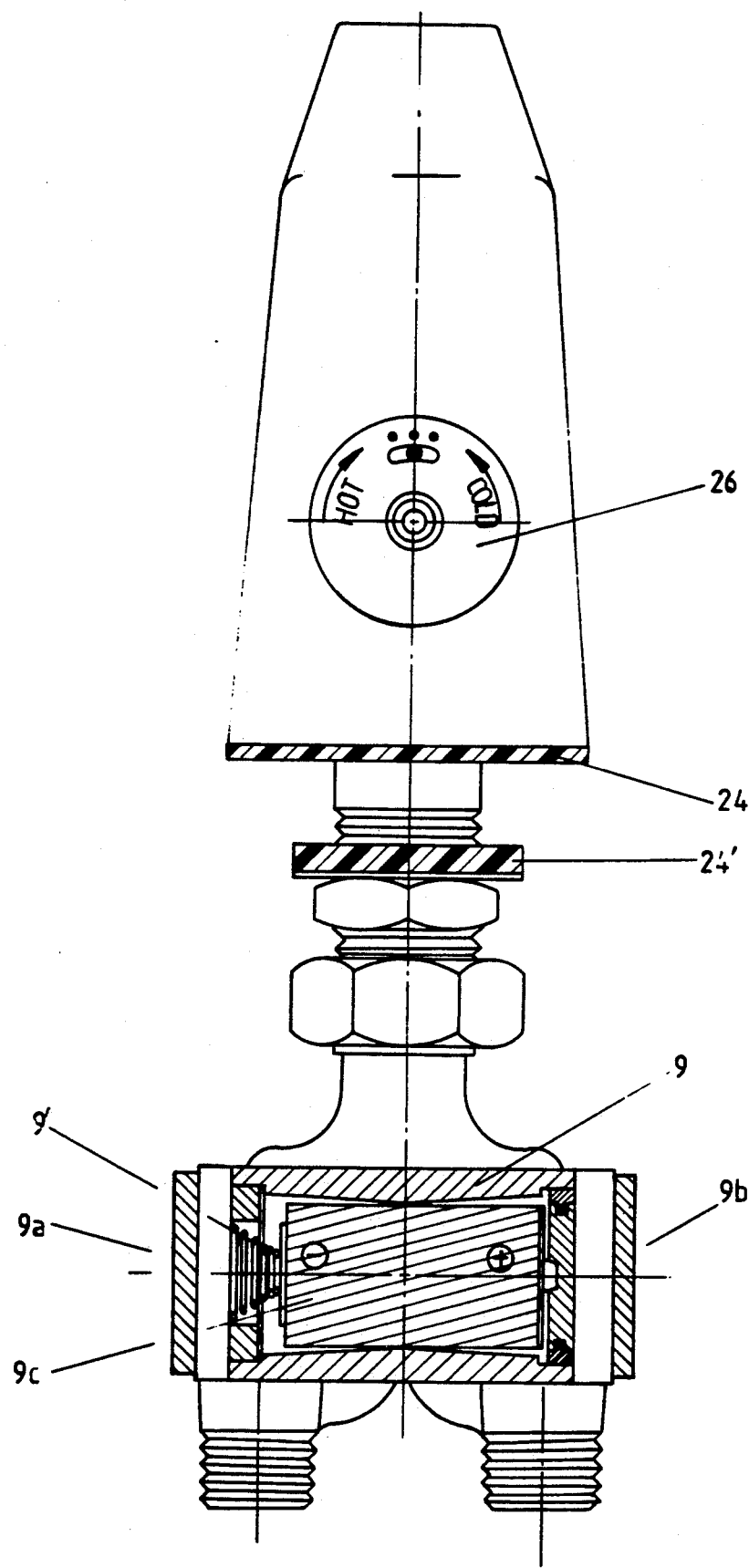
FIG. 4 is a rear view of the automatic faucet of FIG. 1, with parts broken away to illustrate the battery mounting.
Figure 5:
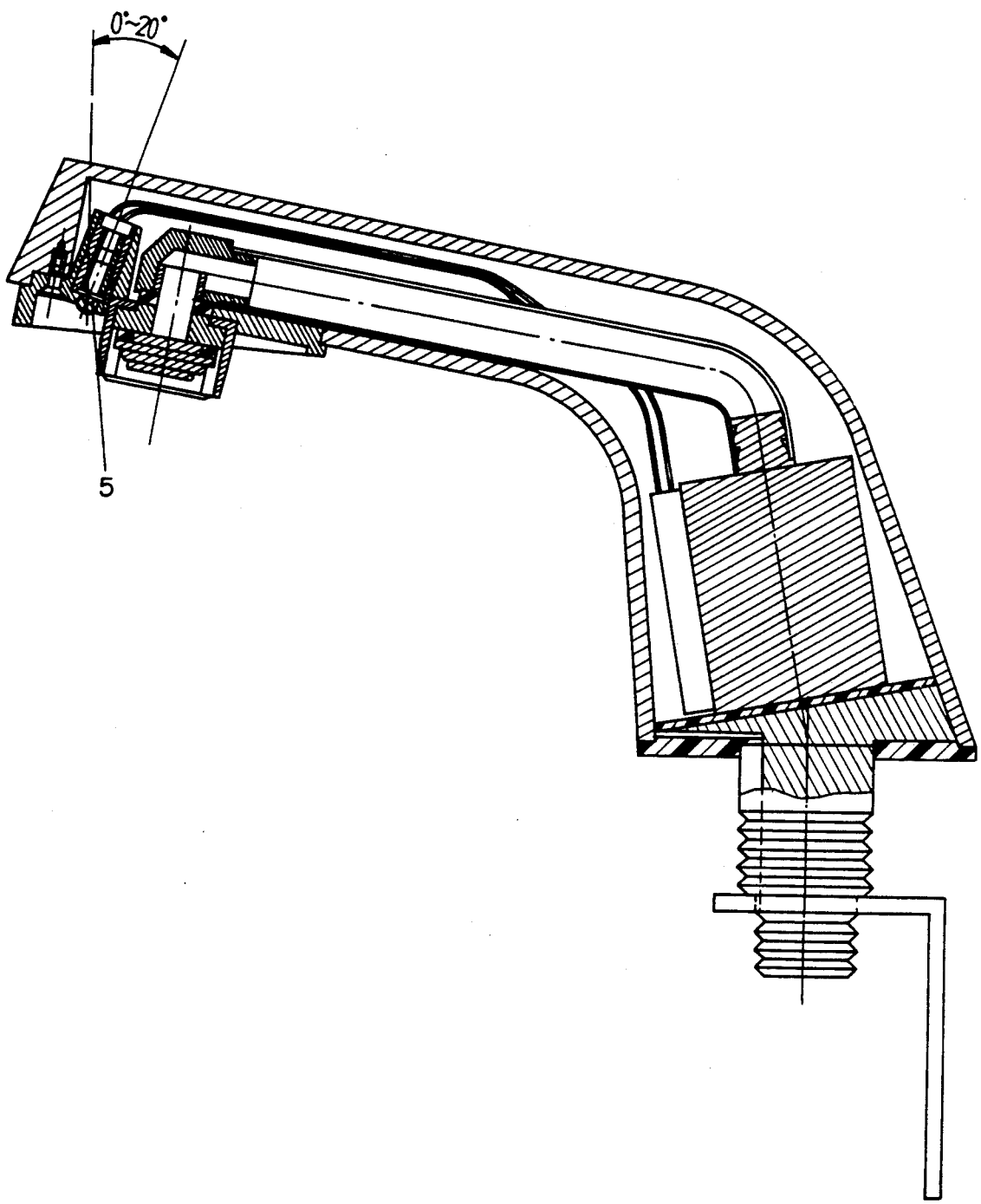
FIG. 5 is a partially schematic view similar to FIG. 2, illustrating the installing position and angle of the sensor.

Referring now to the drawings, and initially to FIGS. 1, 2, 3 and 4, an automatic faucet "T" according to the present invention is illustrated which includes a water supply valve 100, a valve controller 101, (FIG. 2) electronic circuits (hybrid IC), and a hot and cold water mixing valve 2 all assembled as a unit compactly into faucet body I. An aerator 4 and sensor 5 are installed as a unit in a nozzle cover 1a in the discharge end of the faucet with sensor 5 positioned at a suitable angle of 0°–20° to the vertical. The nozzle cover 1a is coupled with the nozzle end of the faucet body 1 by screws 1b. A check valve assembly 8, battery case 9 and filter assemblies 10 are installed on the lower part of the faucet body 1.

Hot and cold water is supplied to the faucet through water supply pipes (not shown) connected to the bottoms of cut-off valves 11 of conventional construction which are, in turn, connected to the lower ends of filter assemblies 10. The latter are connected by flexible tubes 11 to the check valve assembly 8 through the hot water inlet port 8a and the cold water inlet port 8b.

Net-like tubes 10a", 10b" are located within chambers 10a' and 10b' of check valve assembly 8 and surround check valves 18, 19, respectively. The nets serve to filter the hot and cold water received from inlets 8a and 8b. Check valves 18, 19 include sliding pistons 18b, 19b having sealing gasket 18a, 19a secured on the faces thereof facing passages 10a and 10b defined in the ends of chambers 10a' and 10b'. Coil springs 18d, 19d bias the sliding pistons 18b, 19b toward valve seats 18f, 19f to normally close passage 10a and 10b. The resilient force of the springs is adjusted by adjusting screws 18e, 19e which are inserted into threaded holes 17' of screw sleeves 17. The latter are threadedly inserted into the threaded holes 20' of valve body fixing screw sleeves 20 of the check valve assembly 8. The latter include a neck portion 8' including outlet ports 8a', 8b' from chambers 10a, 10b and is threadedly coupled to the valve body 2b of the hot and cold water mixing valve 2. Thus, check valves 18, 19 are positioned to control passage of hot and cold water to the mixing valve. When the tap is operated pressure upstream of the valve is less than the line pressure so valves 18, 19 open and water is supplied to the tap.

A battery container 9 having a negative plate 9a (FIG. 4), including a contact spring 9' is mounted by screws 9" (FIG. 2) to the rear of check valve assembly 8. The plate 9a is removably secured to battery container 9 which also includes a positive plate 9b defining with plate 9a a battery chamber dimensioned to accept appropriately sized batteries to power the unit as described hereinafter.

As noted, hot and cold water from chambers 10a, 10b are supplied to the mixing valve 2. This valve may be of any convenient construction. For example, the valve, as schematically illustrated in FIGS. 1-3 and 6 may be of the same general construction as the water mixing valve described with respect to FIGS. 14-15 of U.S. Pat. No. 4,886,207 the disclosure of which is incorporated herein by reference. Preferably, however, the mixing valve has the construction illustrated in FIG. 11. As seen therein, when water flows from tubes 8a, 8b to valve 2 it first confronts the piston 16 of the mixing valve 2. The cylindrical piston 16 has opposed ports 16a, 16b formed therein for respectively receiving water from tubes 8a, 8b and discharging the water combined within the piston to the supply valve 100 thereabove. The ends of piston 16 have ports 16c, 16d formed therein so that the water in the piston is also passed to the chambers 16', 16" on either side thereof. A temperature sensor 13 is coupled with the piston 16 in the chamber 16'. This temperature sensor 13 is of known construction, as generally described hereinafter, and its sensitivity is adjusted by a control knob 26 engaged by a worm screw arrangement 14 to contract or expand the sensor, thereby to set the desired temperature. If the water temperature detected by the sensor 13 is lower than the set temperature determined by the temperature setting knob 26, piston 16 will slide to the left under the influence of spring 16b' by contraction of the sensor 13, thereby to close the inlet hole of cold water 10b, and at the same time to open the inlet hole of hot water 10a much wider. As the amount of hot water influx is larger than that of cold water influx, the water temperature inside the mixing valve 2 rises to the set temperature.

On the other hand, if the water temperature in the mixing valve 2 is higher than the set temperature, the plunger will be pushed out by expansion of the temperature sensor 13. This movement slides piston 16 to the right and blocks the hot water inlet hole 10a at the same time the inlet hole of cold water 10b opens wider, the amount of cold water influx is going to be greater than that of hot water influx. Therefore, the water temperature in the mixing valve 2 falls to keep the set temperature.

Volume control is effected by the control knob 26a connected by worm screw arrangement 14a to piston 16. This adjusts the radial position of port 16b to outlet 2a and thereby controls the volume of water exiting the mixing valve.

As shown in FIGS. 1 and 6a–6c, a water supply valve 100 is provided which receives the mixed water from mixing valve 2. Valve 100 includes a valve body 102 which contains a piston 106 slidably mounted in the body and having a flexible sealing ring 106' which divides the interior of the valve body into a first chamber 108 and a second chamber 107. The water supply valve is controlled by a valve controller 101, which comprises a pilot valve 103, valve driver gear 104a and a valve driving motor 104.

Valve body 102 includes an inlet hole 102a (FIG. 6a) coupled in any convenient manner to the outlet hole 2a (FIG. 11) of the hot and cold water mixing valve 2. The outlet hole 102b of the valve body 102 (FIG. 6) is coupled with the hose 7 which is connected to aerator 4.

Figure 6A:
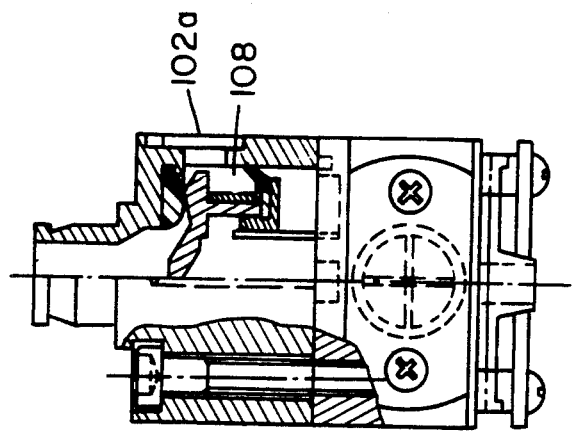
FIG. 6a is a side view of the water supply valve of FIG. 6, taken along line 6a-6a with parts broken away.
Figure 6:
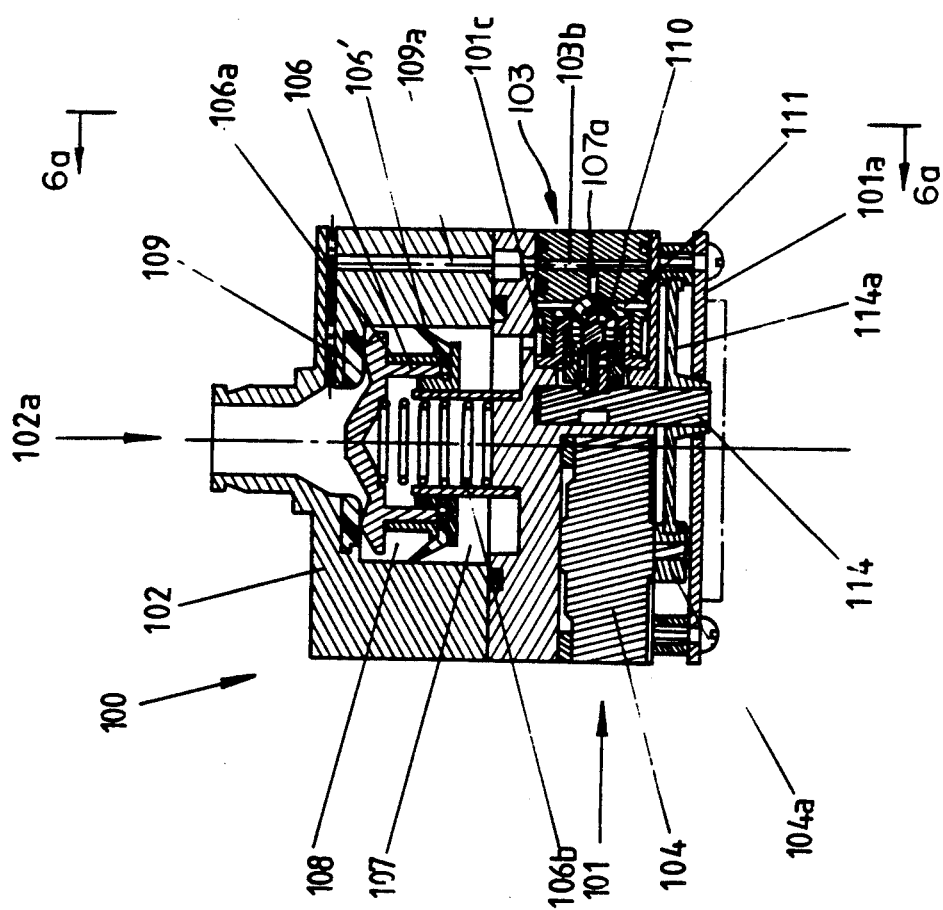
FIG. 6 is a cross-sectional view of the automatic water supply valve, taken along line 6—6 of FIG. 2.
Figure 6B:
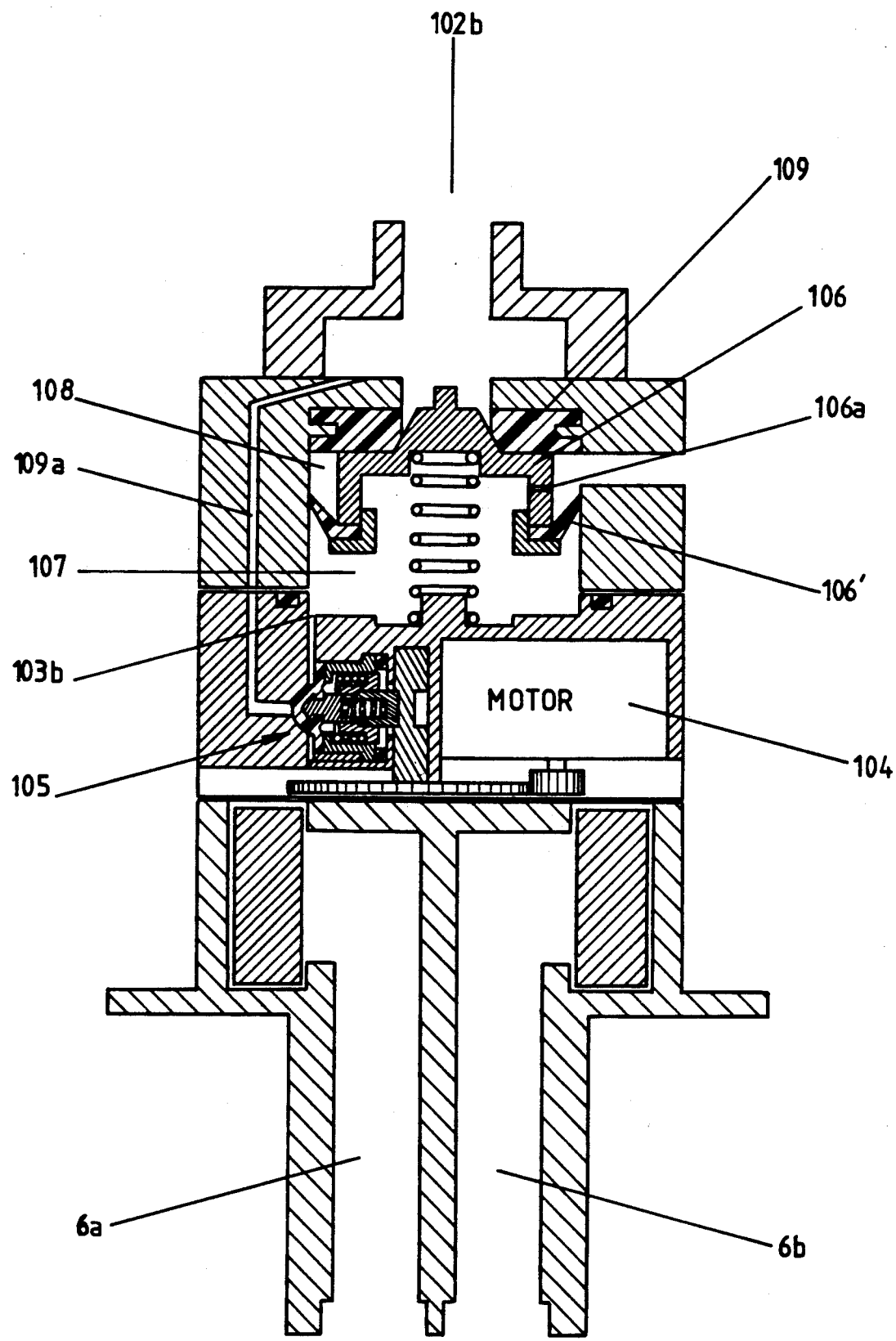
FIG. 6b is a schematic cross-sectional view illustrating the closed condition of the automatic water supply valve of FIG. 6.

As mixed water in the hot and cold water mixing valve 2 enters the first chamber 108 (FIG. 6a) through the outlet hole 2a of the water mixing valve 2 and inlet hole 102a of water supply valve 100, the water also enters the second chamber 107 through a small inlet hole 106a on the valve piston 106 (FIG. 6b). Therefore, water pressure in the first chamber 108 is initially the same as that of the second chamber 107 and the valve remains closed.

Figure 6C:
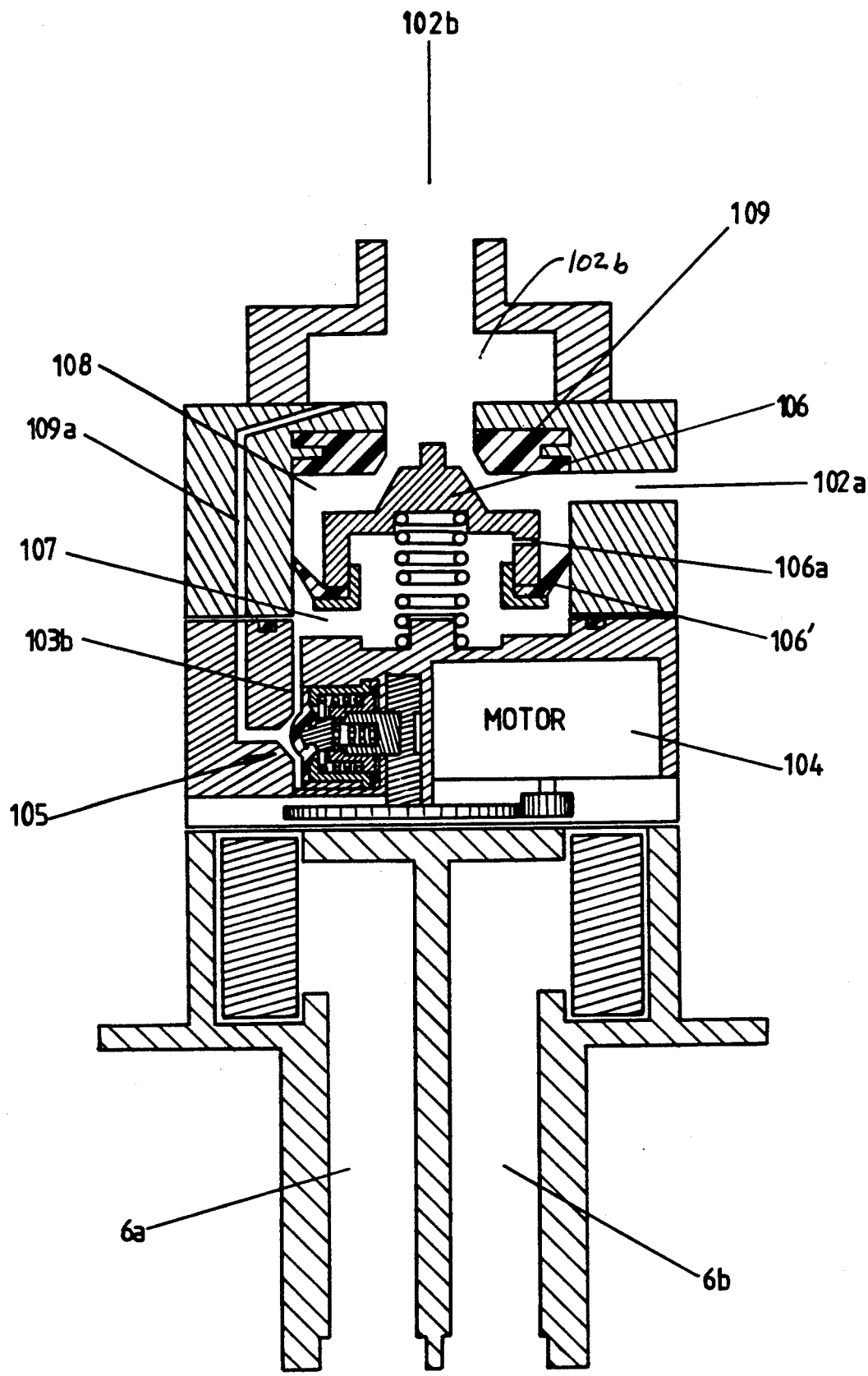
FIG. 6c is a view similar to FIG. 6b illustrating the opened condition of the automatic water supply valve of FIG. 6.
Figure 7:
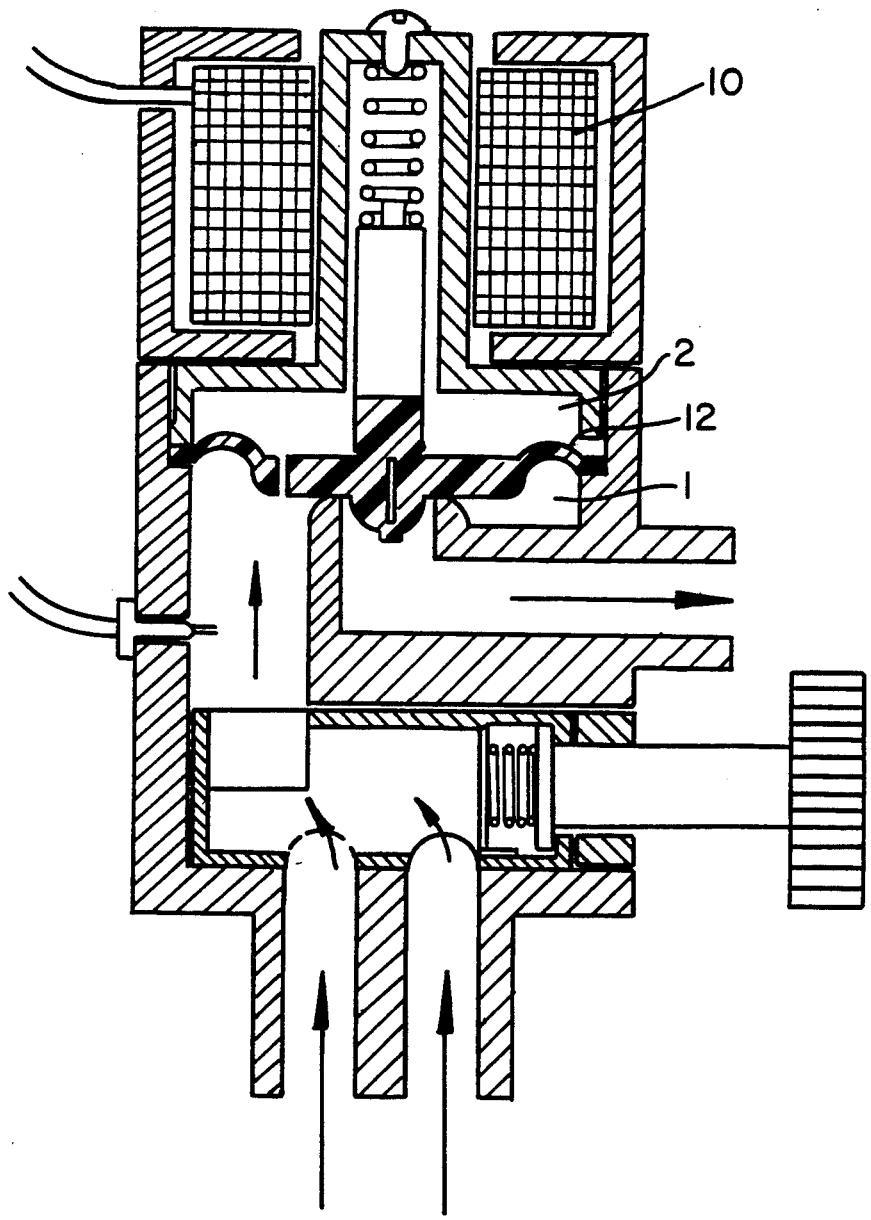
FIG. 7 is a schematic cross-sectional view of an existing automatic water supply valve.

If the detecting sensor senses the presence of a physical object at this time, it will send a detecting signal to the valve driving motor 104 through electronic circuits (hybrid IC) 5'. By that pulse signal, power (electricity supplied from the battery or from a transformer) is supplied to the valve driving motor to drive the motor 104. As the motor 104 is driven it drives gear 10a, which in turn drives cam gear 114a in which a cam 114 is mounted. As described hereinafter, this rotates cam 114 through 180°. As a result of this rotation, the concave face of cam. 114 is brought into position opposite the plunger 110 which rides on the cam (FIG. 6b). This plunger also engages the diaphragm 111 which, as seen in FIGS. 1, 6 and 6b is also subject, on its opposite face, to water pressure in second chamber 107. As a result, the diaphragm moves away from its seat (FIGS. 6 and 6c) and water in the second chamber 107 drains to the outlet hole 102b on the water supply valve 100 through the water passageway 109a. As the water pressure in the second chamber 107 is lowered, the valve piston 106 is pushed downwardly by the relatively high water pressure in the first chamber. As a gap between the valve piston 106 and the main seat 109 is opened, the water passes directly from inlet 102a through the outlet hole 102b of the water supply valve 100 to the nozzle (FIG. 6c). When there is a physical object within the detecting range of the sensor 5 (i.e., when the sensor detects an object), power consumption does not occur because the motor 104 remains stationary.

When an object within the detecting range of the sensor 5 is removed, a pulse signal from the electronic circuit 5' will be transmitted to the valve controller 101. The motor 104 is then driven by the pulse signal as power is supplied again to the motor 104. As the cam gear 114a coupled with the motor gear 104a rotates again through 180°, the convex part of the cam 114 pushes the plunger 110 and thus the diaphragm 111 closes pilot valve 113. When pilot valve 113 closes, water in the second chamber 107 will fill the chamber 107 because there is no place to drain. Therefore, the water pressure in the second chamber 107 becomes identical to that in the first chamber 108. As a result, the valve piston 106 returns to the original closed position under the restoring power of the spring 106b. Thus, the valve piston 106 and the main seat 109 engage each other, close the water passage and thereby block the flow of water.

As seen in FIGS. 8a and 8b, in order to stop the rotation of motor 104 after turning the cam through 180°, a hole 114a' is formed in the cam gear 114a, and two sensors are installed in the valve body 180° symmetrically on the arc of the passage of the hole 114a. When the cam gear 114a rotates, the sensors 5 detect the hole 114a' at the point of 180° and send the detecting signal to the valve driver control circuit 104a. The circuit thus produces a signal to activate or deactivate the motor. As a result, at the moment of detecting the object by the sensor 5, the motor 104 rotates the cam gear 114a 180°. The motor then remains stationary at that point, while detecting the object. As the object disappears from the detecting range of the sensor 5, the motor drives again, and stops after rotating the cam gear 180°.

Figure 9:
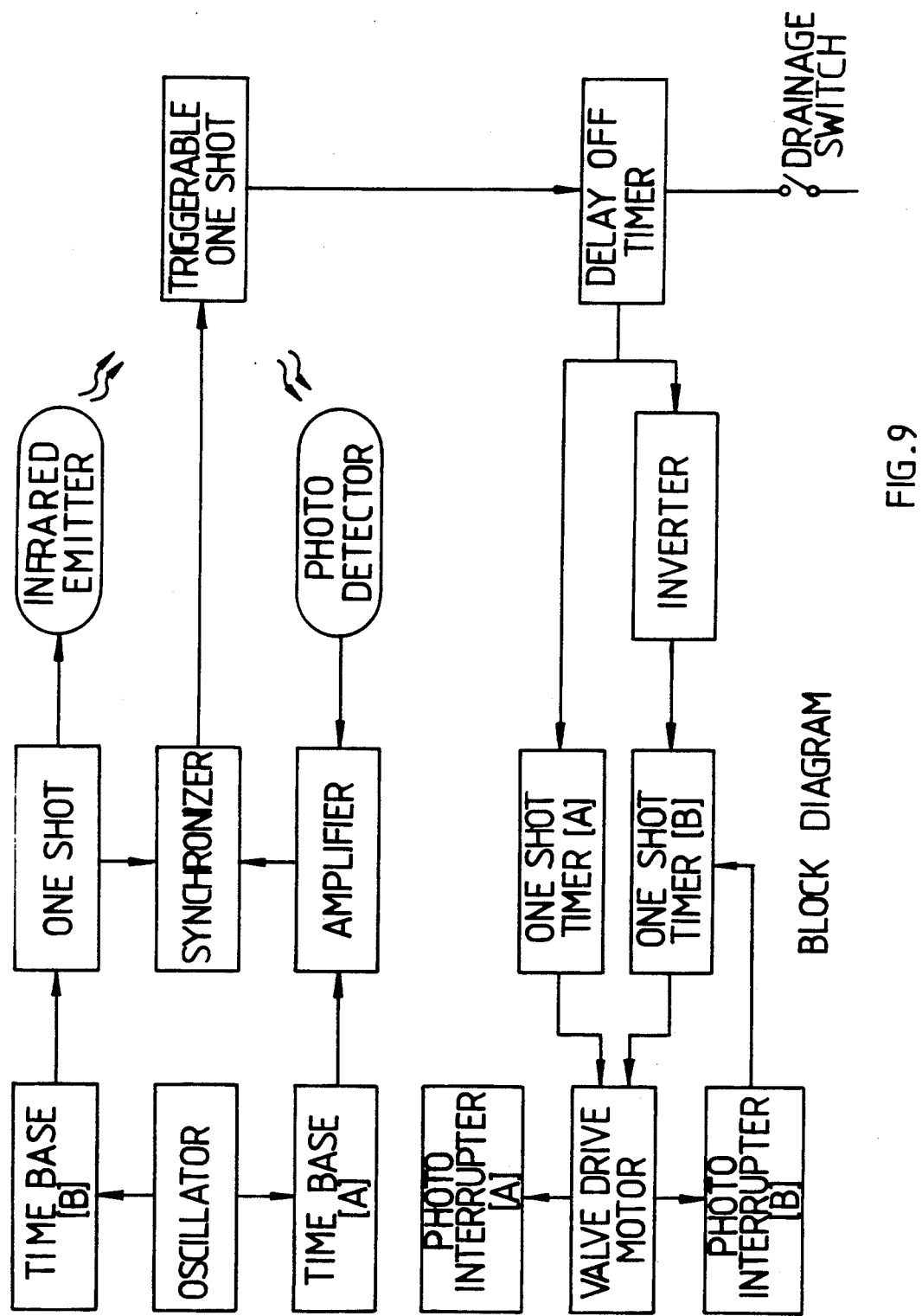
FIG. 9 is a block diagram illustrating the operation of the automatic water supply valve according to the present invention.
Figure 10:
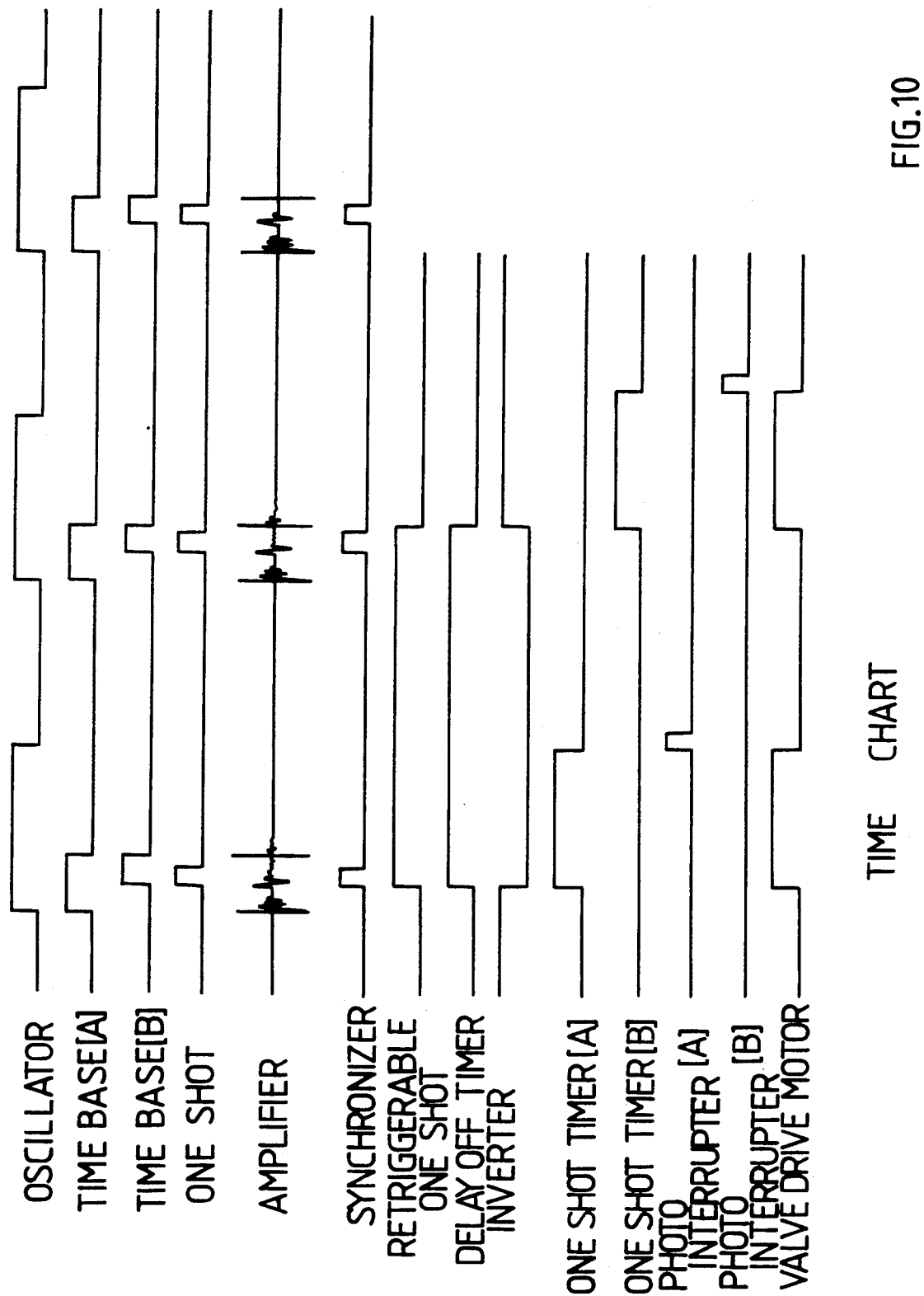
FIG. 10 is a time chart illustrating the signals of the electronic circuit of the automatic faucet.

Referring now to the function of the electronic circuit (hybrid IC) 5′, that will be described with reference to the block diagram FIG. 9 and the time chart FIG. 10. The circuit includes an oscillator which comprises a low power C-MOS Gate IC, and generates the basic signal during performing the emitting and detecting function. The pulse signal generated from the oscillator enters into the time base A and time base B.

In time base B, the rise of pulse signal received from the oscillator delays for fixed time, and the pulse signal of narrow pulse width is generated and is transmitted as the input signal to the synchronizer of a one-shot circuit and the detecting part of the emitting part. The pulse rise of the output signal from the one-shot circuit is generated by synchronizing of the pulse rise of the time base B. The pulse width of the output pulse of the one-shot circuit is set off narrower than that of time base B, and the output pulse of the one-shot circuit is going to become a driving signal of the infrared emitter. In time base A, the pulse signal with narrow pulse width is generated by synchronizing of the pulse signal rise received from the oscillator, and transmits to the amplifier of the detecting part, and the output pulse signal from time base A is designed to synchronize to the fall of the time base B.

The output pulse signal from the time base A acts as an electric current supplying signal of the amplifier circuit in the detecting part, and amplifies the input signal received from the detecting part only when the pulse signal of the time base A is transmitted to the amplifier. All input signals from the detecting part are not amplified continuously, but are cut off by the pulse signal from time base A, thereby minimizing consumption of power. In other words, the current supplied to the amplifier is restricted by the time of pulse width of time base A.

When an amplified signal from the amplifier is received by the synchronizer, the signal which is transmitted to the synchronizer from the time base A and the signal which is synchronized are transmitted to the next step, the retriggerable one-shot circuits. That is, it transmits only the synchronized signal which drives the analog switch by the pulse of time base B. The retriggerable one-shot circuit performs the action of keeping the input pulse of narrow pulse width longer.

In other words, the output pulse of the one-shot circuit is the driving power of the infrared emitter. At this time, the infrared emitter transmits the infrared ray, and this ray is reflected by the reflector. The reflected signal becomes the input signal of the photo detector, the faint signal which enters into the photo detector is amplified by the amplifier.

Among the output signal of amplifier, except the photo signal, the noise which caused by the cutoff of the supplying electric current from the time base A is included In order to remove this noise, the existence of a reflector can be determined by synchronizing to the pulse width of time base B which is narrower than that of the time base A. When there is a reflector in the detecting range, the synchronized pulse becomes a trigger pulse of the retriggerable one-shot, and maintains the pulse output of the retriggerable one-shot high. And, this is inverted again by the inventor, and performs the OFF function of the valve. The signal which is not inverted acts as a trigger signal of the one-shot timer A and the inverted signal acts as a trigger signal of the one-shot timer B, and this again becomes a driving signal to the valve drive motor.

The time constant of the one-shot timer A and B can be changed by the organization of mechanism of the valve control system, and this is to prevent electric discharge of the battery by malfunction of the motor driving system. When there is no pulse from photo interrupter, in other words, when there is malfunction in the system, it performs the function of preventing the flow of electric current to the motor for more than the determined time of 30 seconds.

The signal from the one-shot timer A rises by the synchronization to the pulse rise in the delay off timer, and falls by triggering to the pulse rise of the photo interrupter A. The photo interrupter A is an apparatus to make the high level signal from one-shot timer A, low level, and it is installed in the ON state of the valve. It also rises by triggering of the pulse rise of the invertor and falls by triggering of the pulse rise of the photo interrupter B. The photo interrupter B is an apparatus to make high level signal low level, and it is installed in the OFF state of the valve.

The delay off timer which also worked as a safety device of the detector serves to restrict the continuation of the opening of the valve more than a determined time (e.g , 30–60 seconds). Thus, it provides the automatic water cutoff function The delay off timer can be set for a predetermined time (30–60 seconds) to prevent continuing flow of water when a physical object (i.e., a reflector) is accidently placed in the detecting range of the sensor or when tape, paper, gum, etc. is adhered to the surface of the sensor. Thus, the water flow is automatically stopped after that time even if the sensor is disturbed.

Figure 13:
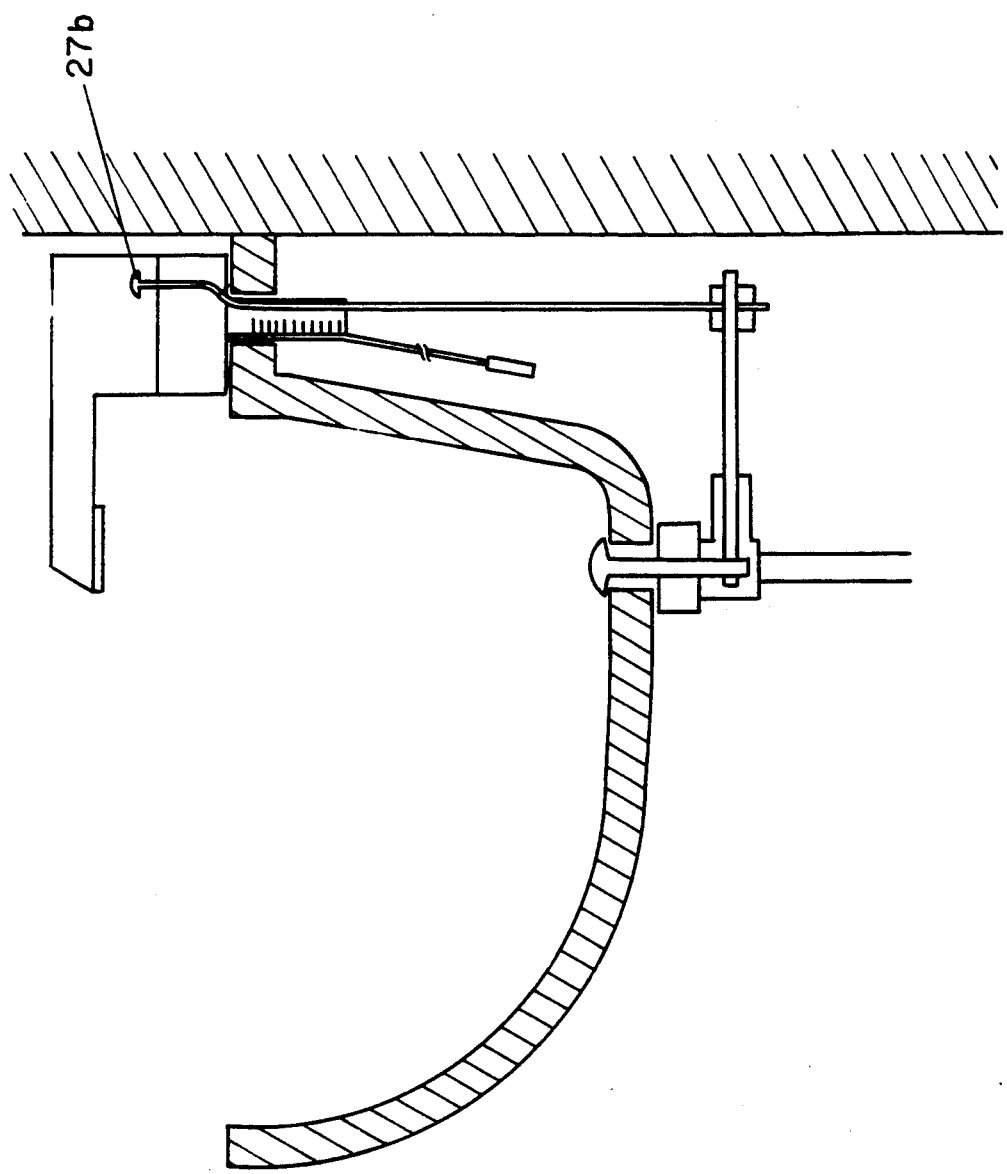
FIG. 13 is a schematic side sectional view showing a drainage control feature of the invention.

In accordance with another feature of the invention, a switch 27a may be placed on the drainage control rod for the sink drain (see FIGS. 13 and 14) which is used to open and close the drain hole of the sink. The switch is arranged such that when the rod 27b is pulled up, the drain hole is closed same time the switch is turned to ON to send a signal (see FIG. 9) to the delay off timer. The delay off timer then generates its signal to permit water flow for a determined time. After that time, the water flow is stopped automatically. After the user has washed in the sink, pushing down on the drainage rod will open the drain hole and at the same time the switch becomes OFF. When this signal is sent to the delay off timer, the detecting function of the sensor is restored. After that, the automatic faucet returns to the function of automatic water flow. At this time, there is no inconvenience of closing the hole and turning the knob to receive the water because when the drain hole is closed, the water flows automatically. Because the set time is determined by the required time to fill the appropriate amount of water to the wash basin, there is no danger of overflow, and the water supply time is determined by the side of the sink. The valve drive motor which performs the ON/OFF function of the valve directly sets the two operating points. By driving the motor only at the moment of reaching those points, thereby the power requirement can be minimized to operate the ON/OFF motion of the valve.

Figure 11A:
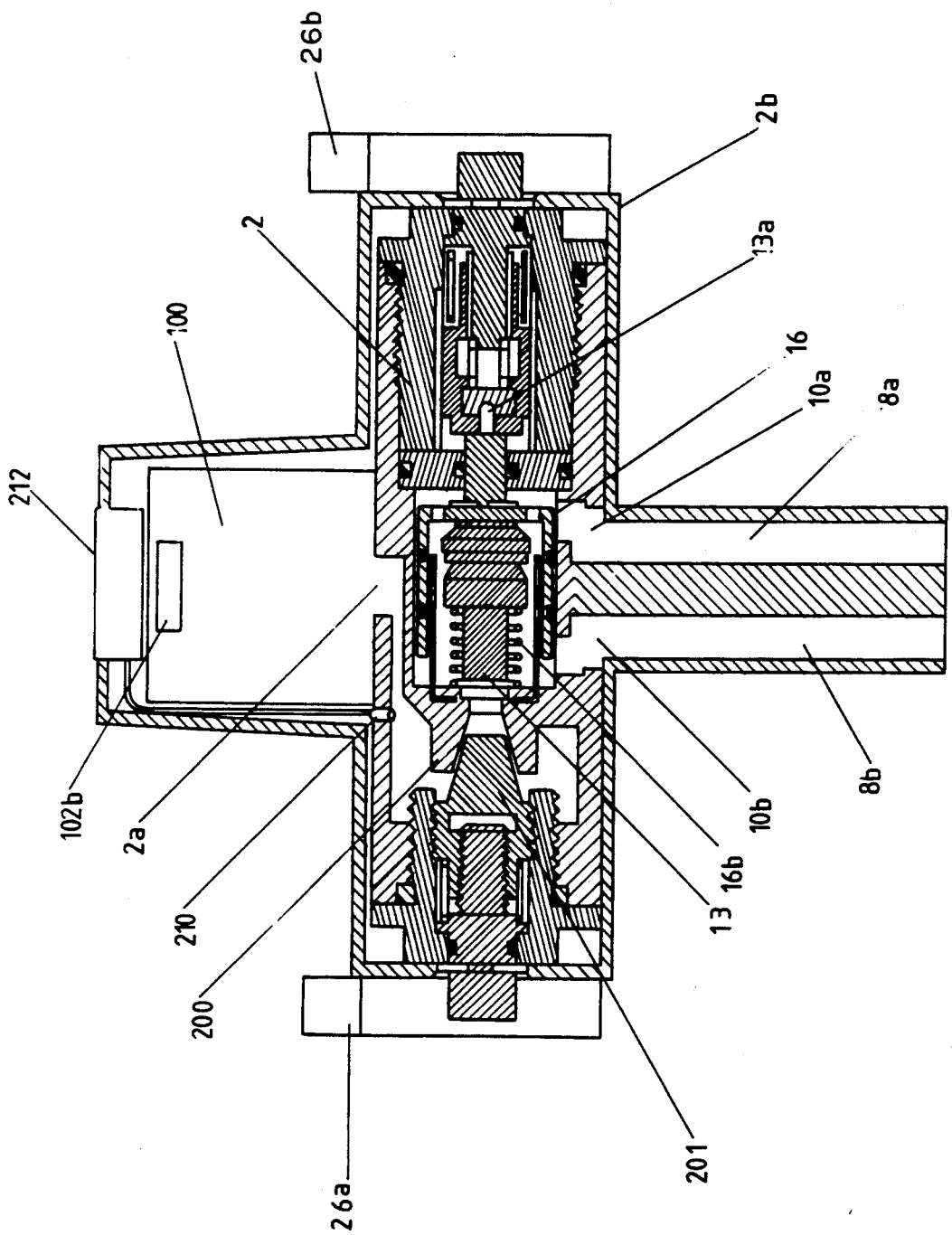
FIG. 11a is a cross-sectional view similar to FIG. 11 of another embodiment of mixing valve.
Figure 12:
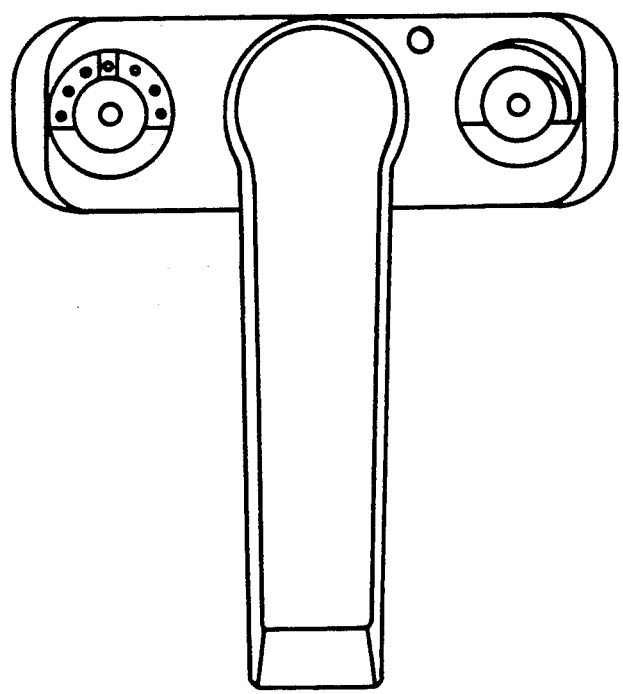
FIG. 12 is a top plan view of another shape of the automatic faucet.
Figure 11:
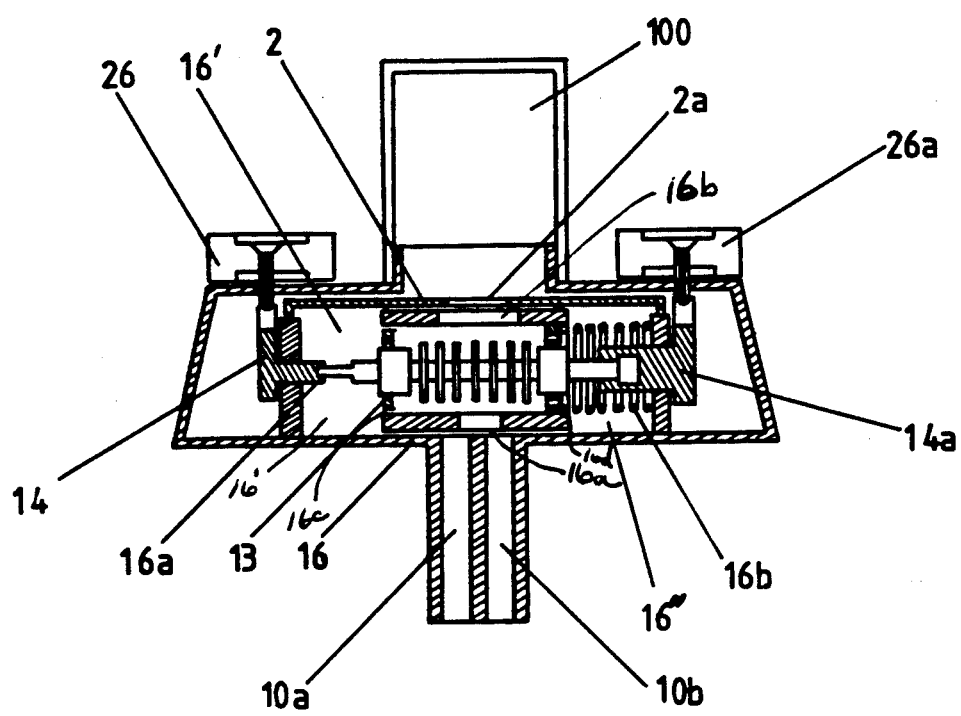
FIG. 11 is a cross-sectional view of the mixing valve of the automatic faucet.
Figure 12A:
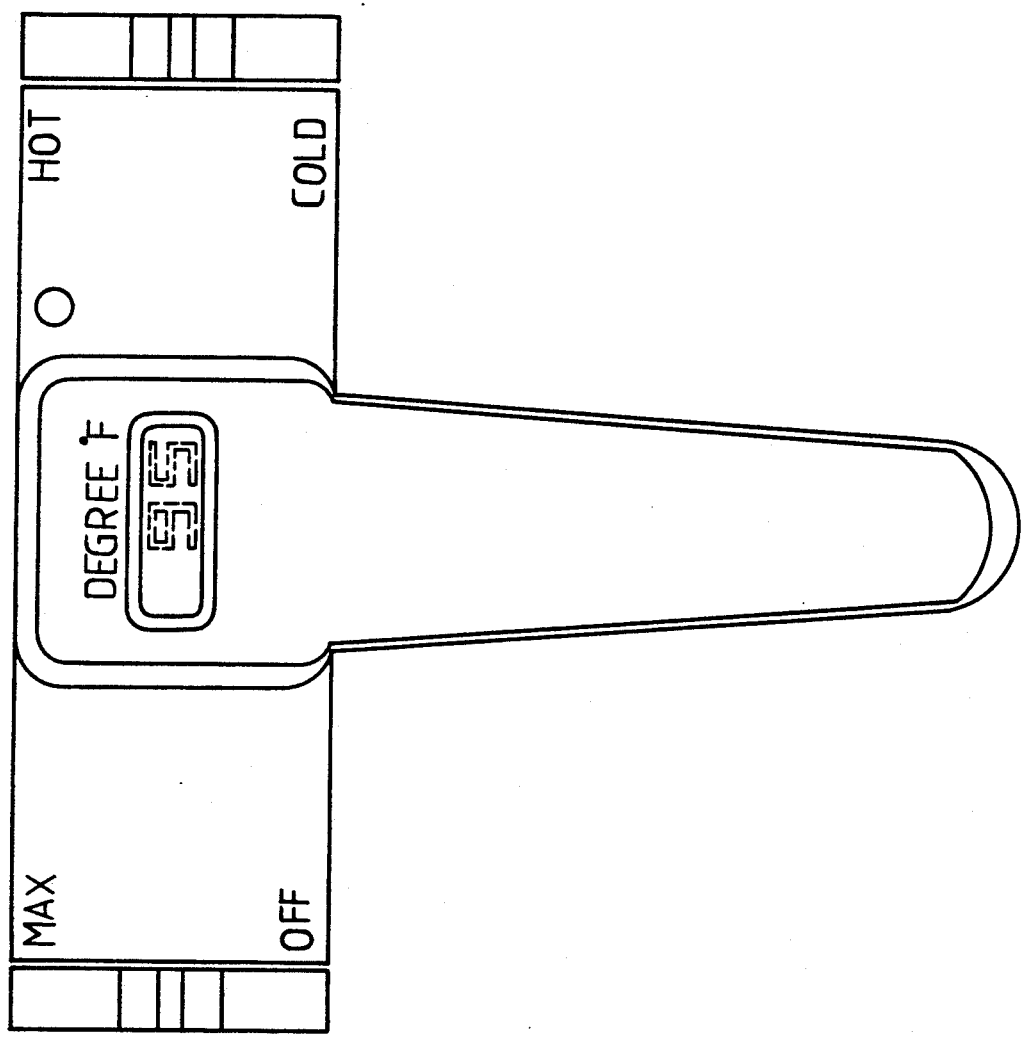
FIG. 12a is a view similar to FIG. 12 showing the use of a digital temperature read out.

FIGS. 11a and 12a illustrate another embodiment of the invention in which the hot and cold water mixing valve 2 comprises a mixing valve body 2b, a piston 16, which is coupled with a temperature sensor 13, in turn engaged with a temperature control handle 26b. The opposite side of the piston is engaged by spring 16b and faces a conical outlet port 200. The flow volume is controlled by handle 26a which adjusts the position of the conical plug 201 relative to port 200. The temperature sensor 13 is filled with the temperature sensitive materials such as wax, liquid, or others, or is made of bimetal. By expansion or contraction of this temperature sensor 13, the cylindrical piston 16 will slide from side to side within the chamber 16", thereby varying the amount of water that flows out of supply tubes 8a and 8b. As seen in FIG. 11a, water from tube 8a enters the interior of piston 16 through ports 16a on one end wall and water from tube 8b enters the piston over its open end 16d. Thus, water is mixed in the piston and temperature is transmitted by plunger 17 to sensor 13 to adjust the position of the piston The mixed water flows through port 200 for discharge through port 2a to control valve 100.

If the temperature of water flows into the piston 16 as hot water and cold water through the inlet holes 10a, 10b in the hot and cold water mixing valve 2 is lower than the set temperature, it will be detected by the temperature sensor which then contracts. As the piston 16 slides to the left under the influence of the spring 16b, the inlet hole for cold water, 10b, is closed while at the same time the inlet hole for hot water, 10a, is opened. Because the amount of cold water influx is larger than that of hot water influx, the water temperature in the mixing valve rises.

On the other hand, when the water temperature in mixing valve 2 is higher than the set temperature, plunger 16 slides the piston to the right by the expansion of temperature sensor 13. The inlet hole for hot water, 10a, is then closed at the same time the cold water inlet hole 10b is opened. By that, the amount of cold water influx becomes larger than that of hot water influx, the water temperature in the mixing valve 2 becomes lower, thereby the set temperature is maintained.

In this manner, water is mixed in mixing valve 2 to the appropriate set temperature and flows into the water supply valve 100 through the inlet hole 100a of that valve.

If desired, a separate temperature sensor 210 can be provided in any convenient manner to create a digital read out on an LCD display unit 212 (FIG. 12a).

While the present invention has been particularly described with reference to a preferred embodiment, it will be appreciated by those skilled in the art that various changes and modifications may be made therein without departing from the scope or spirit of the invention.

What is claimed is:

1. A water supply valve including a valve body having a water chamber formed therein; a valve piston in said chamber and dividing said water chamber into first and second chambers, said valve body having a water inlet and water outlet opening formed therein and communicating with said first chamber, said valve piston, in a first position, closing communication through said first chamber between said water inlet and outlet opening and, in a second position, opening communication therebetween; pilot valve means connected between said second chamber and said outlet opening for selectively permitting and closing off communication between said second chamber and said water outlet opening, thereby to reduce pressure in said second chamber when such communication is permitted; sensor means for detecting the presence of a physical object, and means responsive to said sensing means for actuating said pilot valve to permit communication between said second chamber and said water outlet, thereby to permit water pressure in said first chamber to move said valve piston to its second position and open the valve to allow water to flow from said inlet opening to said outlet opening, said sensor means comprising an IR sensor; and said responsive means including an electric motor and transmission means connected between said motor and said pilot valve; said transmission means including cam means rotated by said motor for operating said pilot valve.

2. An automatic faucet comprising a spout body having a water discharge end, sensing means mounted on said spout body at said water discharge end for sensing the presence or absence of an object beneath the faucet; a water supply valve in said spout responsive to said sensing means sensing of an object for discharging water from said spout, said sensing means being mounted in said spout at an angle to the vertical of between 0°-20°; said faucet including a removable nozzle cover mounted on the spout body at said water discharge end, said cover including an aerator, and said sensing means being mounted on said cover adjacent said aerator.

3. The device as defined in claim 2, including an electronic circuit for said sensing means and control means for said water supply valve responsive to said circuit, all contained within said spout body.

4. The device as defined in claim 3, including a check valve assembly, water filters, a battery case for supplying power to said sensing means.

5. A water supply valve including a valve body containing a valve piston defining first and second chambers in said body, a valve controller comprising a pilot valve, a valve driver and a valve driving motor, said valve having a water inlet hole of the water connected to receive water from a mixing valve and a water outlet hole; sensor means for detecting the presence of a physical object and transmitting a signal to the valve driver through an electronic circuit, said circuit generating a pulse signal to operate the valve driving motor, and a cam gear connected to said motor, said cam being rotated upon operation of the motor to drive the pilot valve and thereby open and close the water supply valve.

6. The valve as defined in claim 5, including means for preventing continuous water flow after said valve is opened for a predetermined period of time.

7. The valve as defined in claim 6, wherein said preventing means comprises an adjusted delay off timer which is adapted to stop the water flow after 30-60 seconds.

8. A water supply valve as defined in claim 7, including drainage rod means for opening and closing the drain hole of a wash basin and ON/OFF switch means connected to said rod such that when the rod is operated to close the drain hole the switch is placed in the ON state and causes the delay off timer to allow water flow for a preset time and when the drainage rod is operated to open the drain hole the switch is returned to an OFF state and the sensing function of the sensor means is recovered.

* * * * *